March 9, 1948. E. W. BRIDGE 2,437,637
SLICING, CUTTING, AND CORE-REMOVING MACHINE
Filed Jan. 7, 1946 5 Sheets-Sheet 3

INVENTOR,
Edward W. Bridge,
BY Albert E Dieterich,
ATTORNEY.

INVENTOR,
Edward W. Bridge,
BY Albert E. Dieterich,
ATTORNEY.

March 9, 1948. E. W. BRIDGE 2,437,637
SLICING, CUTTING, AND CORE-REMOVING MACHINE
Filed Jan. 7, 1946   5 Sheets-Sheet 5

INVENTOR,
Edward W. Bridge,
BY Albert E. Dieterich
ATTORNEY.

Patented Mar. 9, 1948

2,437,637

UNITED STATES PATENT OFFICE 2,437,637

SLICING, CUTTING, AND CORE-REMOVING MACHINE

Edward W. Bridge, Philadelphia, Pa.

Application January 7, 1946, Serial No. 639,588

5 Claims. (Cl. 146—40)

My invention relates to machines for cutting, slicing, and removing the seed cells or cores of fruits, such as apples, pears, etc.

The invention has for its objects:

1. To provide a machine of an improved construction for the purpose above referred to, in which the separating of the core from the fruit and the slicing of the fruit are accomplished in one operation.

2. To provide an improved machine of the character and for the purposes stated, of a simple, inexpensive construction, and one whose upkeep expense is at a minimum.

3. To provide a machine of the class described, with improved cutting and coring dies having long lives and being so designed and constructed that they may be replaced as complete units.

4. To provide a cutting head whose radial blades, backing plate, coring tube and ejector are formed as a unit, which unit is replaceable with another like unit having a greater or lesser number of radial blades.

Other objects will in part be obvious and in part will be pointed out hereinafter.

To the attainment of the aforesaid objects and ends, invention also resides in the novel details of construction, combinations, and arrangements of parts, all of which will hereinafter be fully described and will then be specifically pointed out in the appended claims, reference being had to the accompanying drawings in which:

Figure 1:
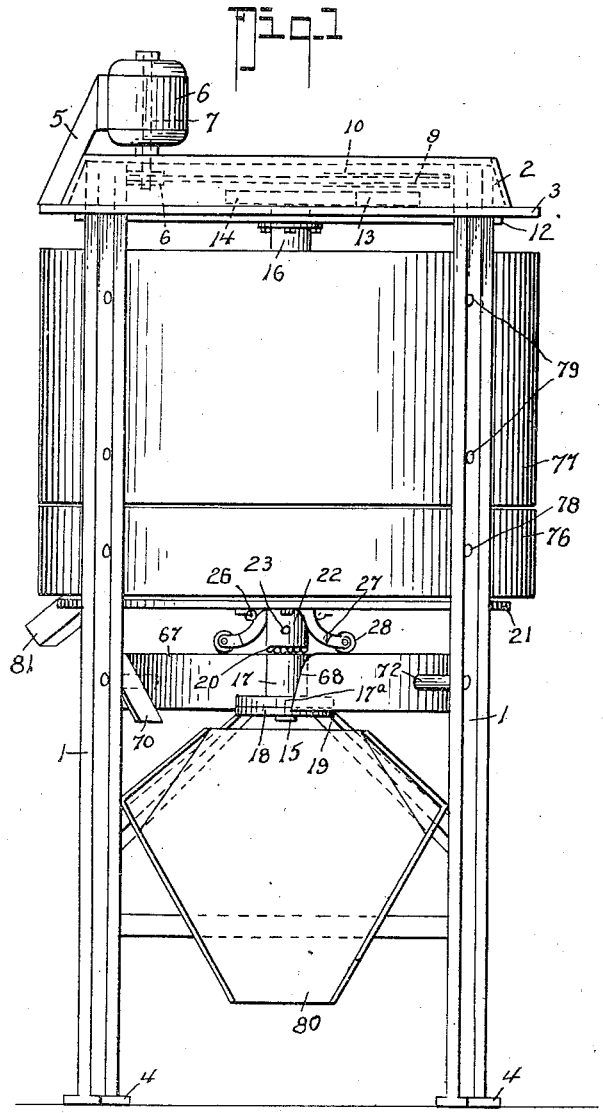
Fig. 1 is an elevation of the machine, looking at the discharge side.

In the drawings, in which like numerals of reference indicate like parts in all the figures, I represents the four posts or standards on which the mechanisms of the machine are supported. A hood 2 is secured over and to the tops of the posts; the hood 2 has a flange 3. The posts 1 have suitable feet or foot-plates 4.

Mounted on top of the hood 2 is a bracket 5 which supports a motor 6 whose shaft 7 passes through an opening in the hood and carries a drive pulley 8. A plate 12 is mounted below the top of the hood and carries a stub shaft 11 on which turns a pulley 10 and attached spur gear 13.

A belt 9 drives pulley 10 from pulley 8. The gear 13 meshes with a spur gear 14, pinned—or keyed or otherwise secured—to the turn-table shaft 15.

A bearing 16 may be attached to the plate 12, for the shaft 15, while a second bearing 17 having a flange 17ª secured to a saddle 18 receives the lower end of the shaft. The saddle 18 is supported by braces 19 from the posts 1. An antifriction thrust bearing 20 lies between the bearing 17 and the hub 22 of the turn-table 21. The hub 22 is suitably secured to the shaft 15, as by a pin 23.

The turn-table 21 has a suitable number of openings 24 spaced apart around a circle whose center is the axis of the shaft 15. Each opening 24 is supplied with a trap-door 25 that is hinged at 26 and has an arm 27 carrying a roller 28 to ride on a circular cam track 67, later again referred to. Each trap-door 25 carries a removable centering cone or pin 29 and a cutting plate or die 32. The pin 29 has a shank 30 that is threaded into the die and is secured by a jam nut 31.

The cutting plate or die 32 has a central opening 33 to receive a coring tube 52, and it has radial grooves or slots 34 to receive cutting blades 55. The die 32 is secured removably to the trap-door 25 by screws 35 so as to be interchangeable with other dies having a greater or lesser number of slots 34 to correspond with the number of blades 55 of the slicing and coring head.

Figure 6:
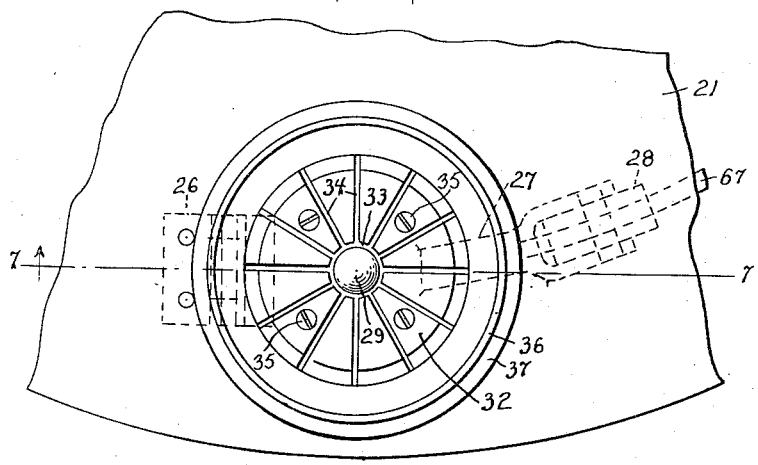
Fig. 6 is a detail plan view of a portion of the turntable and one funnel and trap door.
Figure 7:
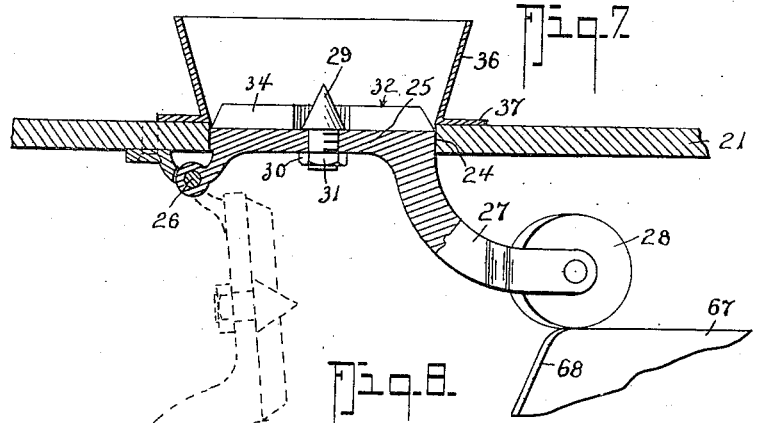
Fig. 7 is a section on line 7—7 of Fig. 6.

A funnel 36 having a flange 37 is secured over each hole 24 as shown in Figs. 6 and 7 for a purpose presently understood. The funnels 36 hold the pieces of fruit against falling apart so that when door 25 is dropped down the pieces will be directed by the funnels 36 through the hole 24 into the chute 81. The cam 67 does not release the trap-door until the unit is in a position over chute 81. The plate 32, being carried by the trap-door, goes with the door as a unit.

A flanged drum 38 is secured, concentrically with the shaft 15, to the turn-table 21 as at 39 and carries brackets 40, in number corresponding to the number of cutting and coring units in the machine. The brackets 40 carry plunger guides 41 in which the cutting-head plungers 42 slide up and down.

The plungers 42 have studs 43 on which cam-engaging rollers 44 are journaled. Each plunger 42 has a base flange 45 secured to its cutter head by cap screws 46.

Each cutter head comprises a backing plate 47 having a pair of diametrically oppositely disposed apertured ears 48. It also has a set of radial slots 49 in which vertical blades are set and secured by welding, soldering, or brazing.

The backing plate 47 also has a central hole 50, counter-bored as at 51, to receive a coring tube 52. The lower end of the tube 52 is longitudinally slotted as at 54 and undercut, to receive the dovetail projections 56 of the radial blades 55. The tube 52, blades 55, and backing plate 47, when assembled, comprise an integral structure. The blades 55, being firmly secured to the backing plate 47, the dovetailed projections 56 will hold the coring tube firmly in place. The lower edge of the coring tube 52 is beveled, as at 53, to comprise a sharp cutting edge. Likewise, the lower edges of the blades 55 may be sharpened if desired.

Figure 4:
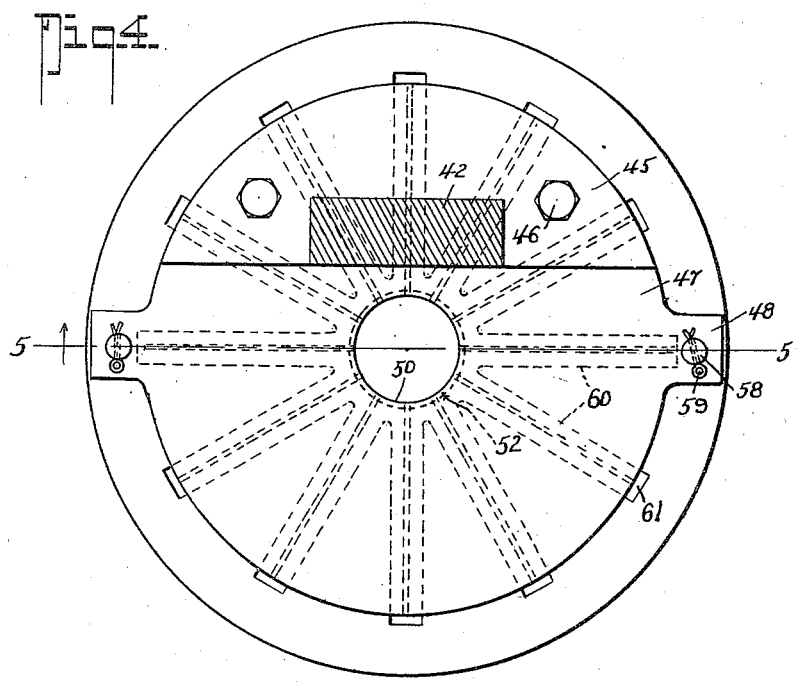
Fig. 4 is a detail plan view of one of the cutting heads and a portion of the head-carrying plunger shown in cross section.
Figure 5:
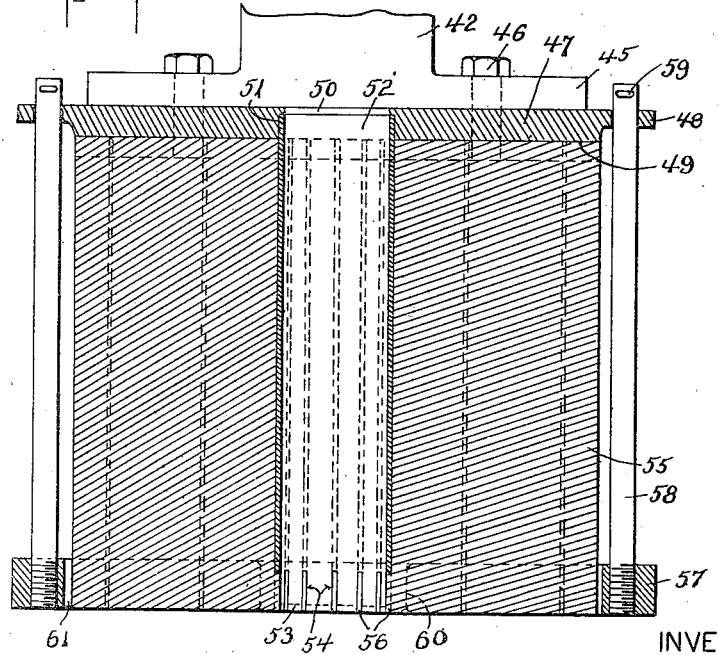
Fig. 5 is a vertical section on the line 5—5 of Fig. 4.
Figure 8:
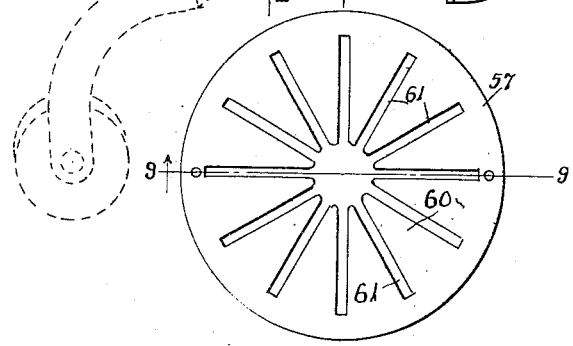
Fig. 8 is a plan view of one of the ejector rings.
Figure 9:
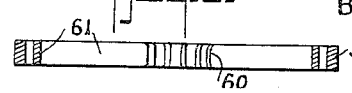
Fig. 9 is a section on the line 9—9 of Fig. 8.

57 designates a gravity-actuated ejector ring which has rods or pins 58 that project through the holes in the ears 48 and have stop cotters 59 to prevent the ring from falling too far. The ring 57 carries ejector fingers 60, best shown in Figs. 8 and 9. The fingers lie between adjacent blades 55, as shown in dotted lines in Fig. 4 and provide slots 61 through which the blades 55 pass. Cutter heads having a greater or lesser number of blades than that shown may be employed if desired.

Suitably supported by the posts 1 and held in place by spacers 71 is a plunger-operating ring-cam-track 62 which has a lowering portion 63 and a raising portion 64, and on top of which the rollers 44 of the several units ride. A pressure-applying cam track 65 is suitably supported over the lowering portion 63, as by brackets 66 mounted on plate 12. The rollers 44 ride under cam track 65.

The trap-doors are closed and held closed during the major portion of the travel of the units by a ring-cam track 67 having a releasing incline 68 and a door-raising and closing, wide inclined plate 70. The cam track 67 is held in place by spacers 72 secured to it and to the posts 1. The plate 70 is secured to the inclined edge 69 of the cam track 67.

Secured rigidly to each bracket 49 is a rod 73 which carries a core-extracting piston 74 that is adapted to enter the coring tube 52 when the cutting head is rising, in order to push out or eject the cores cut by the tube.

Figure 2:
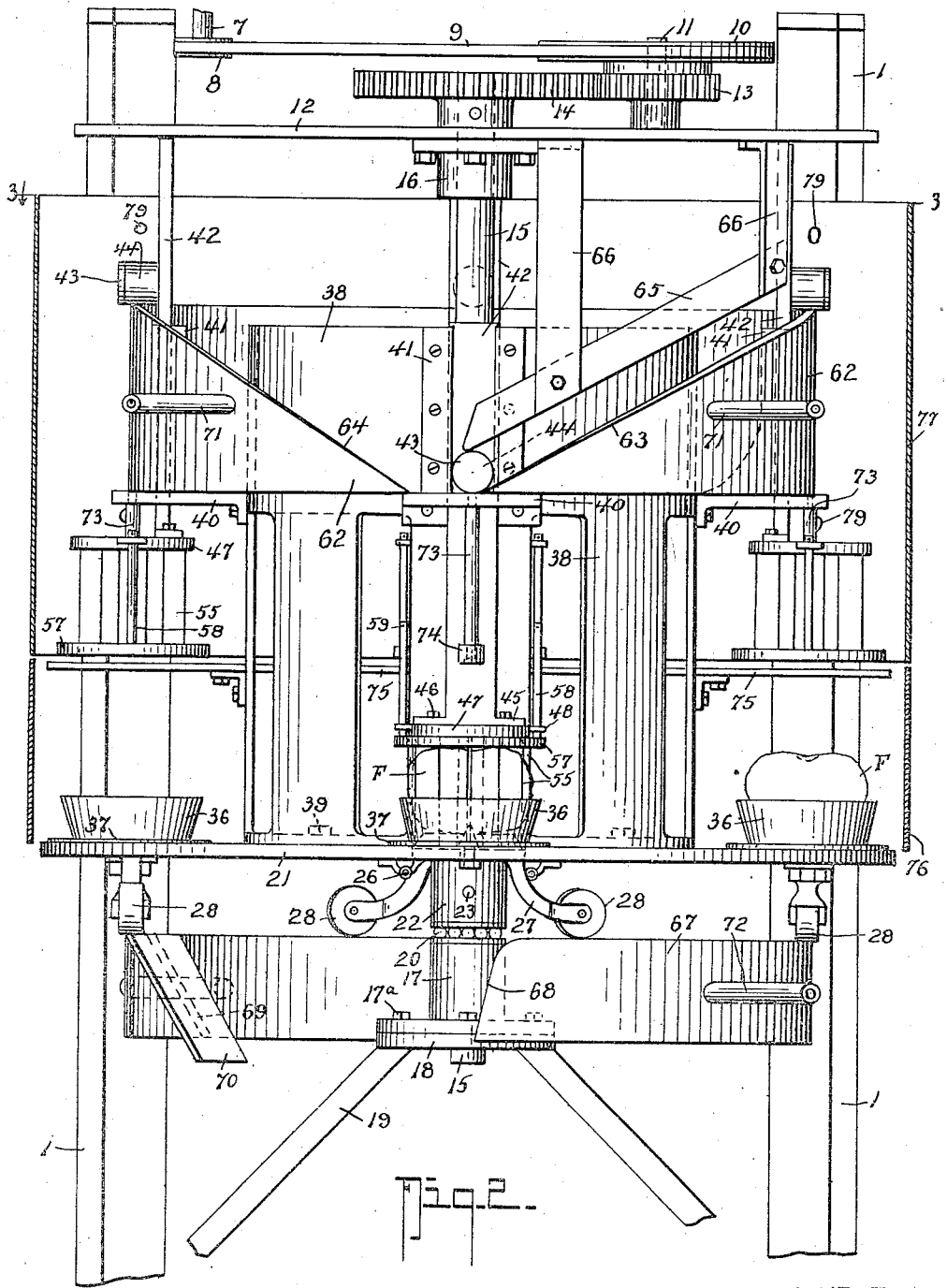
Fig. 2 is an enlarged detail elevation of a portion of the same, the hood being omitted, and the upper and lower shields being shown in section.
Figure 3:
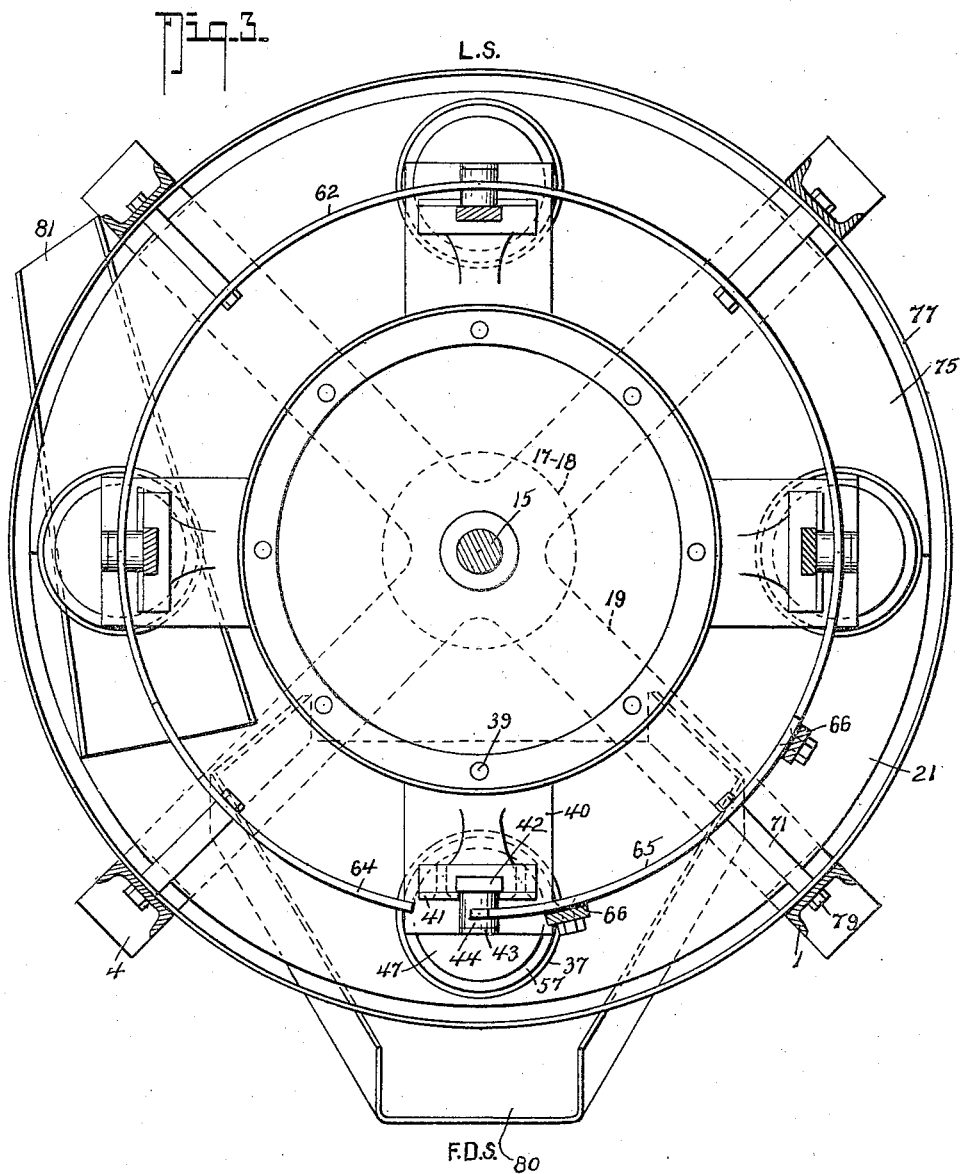
Fig. 3 is a horizontal section on the line 3—3 of Fig. 2.

A horizontal guard plate 75 may be located beneath the cutting heads below the high portion of the cam track to prevent the attendant from coming into contact with the blades when placing the fruit in the funnels. Annular guard plates or shields 76 and 77 may also be provided if desired. The guard plate 75 is stationary and extends over the upper half of the circumference as viewed in Fig. 3, and as so constructed does not interfere with the lowering of the cutting plungers elsewhere. The shields may be made of opaque or transparent material as desired. The lower shield does not extend over the filling-station position of the machine (180° from that shown in Fig. 2). The shields are secured to the posts 1 by bolts and nuts or screws 78, 79, or in any other suitable way.

When the trap-doors open, the slices of fruit drop onto a chute 80 and are discharged onto or into suitable receivers (not shown), while the cores are later ejected into a chute 81 which delivers them from the machine.

Operation

As the turn-table brings the funnels 36 to the loading station (L. S., Fig. 3), the operator places the fruit to be sliced and cored in the funnel, placing the stem end (preferably) over the pin 29. At this time, the cutting and coring head is in its elevated position. As the turn-table continues its travel, roller 44 will enter the downwardly inclined passage below the cam 65 and the cutting and coring head will be lowered until it reaches the position shown in the middle of Fig. 2, by which time it will have sliced and cored the fruit. The ejector-ring fingers 60 will be resting on the fruit. The ejector ring 57 and its fingers hold the segments of fruit down by gravity while the blades are being raised and strips the fruit from the blades for a fast discharge of the fruit through the hole in the revolving table.

As the unit passes on, roller 28 (right-hand one in the middle of Fig. 2) will leave cam track 67 via end 68 and the trap-door 25 will drop open to release the slices of fruit onto chute 80, the core being retained in tube 52.

On further travel of the unit, said roller 28 will ride up the incline 70 to close the trap-door. In the meantime, roller 44 rides up the cam track end 64 to raise the cutting and coring head. As the head rises, plunger 74 will enter tube 52 and push the core down and out. By the time the core is ready to fall, the cutting and coring head will be over the core chute 81, onto which the core falls and by which the core is delivered from the machine.

The machine is, preferably, so timed that the trap-door will fall open as soon as the cutting and coring head has completed its downward stroke.

From the foregoing it is thought that the operation of my machine will be clearly understood.

The turn-table may be driven with a continuous motion, or a Geneva gear may be used in place of gears 13 and 14 to give an intermittent or step-by-step movement to the table if desired. The Geneva gear drive, being a well known movement, need not be further referred to, nor need it be illustrated.

The cutting plate 32 may be constructed of metal, fibre or rubber-base material, and is so designed as to permit the cutting blades to cut through the bottom of the fruit without letting the cutting edges of the blades strike the plate. This plate, like the cutting head of a unit, is removable for substitution of another plate to correspond to the particular cutting head to be used.

The funnel 36 prevents the segments of the fruit when cut from bursting open like a flower and becoming scattered over the top of the table. The funnel directs the cut pieces of fruit through the hole in the table as the cutting head rises toward its normal position.

Since the two cams 62 and 67 are stationary fixed-position cams, should the operator take the machine apart, he can readily reassemble it without the machine getting out of time.

From the foregoing it is thought that the construction, operation, and advantages of my invention will be clear to those skilled in the art.

What I claim is:

1. In a fruit slicing and coring machine; a turn-table on which the operating units are mounted, and which has openings through which fruit segments are discharged; a hinged trap-door for each opening; a stationary cam track located below the table; a cam-engaging roller on an arm on the trap-door for engaging said cam track and holding the door shut; a cutting plate on the trap-door to project through the turn-table opening; a cutting-head having cutting edges cooperating with said cutting plate and a funnel member mounted on the turn-table and encircling said opening and said cutting plate, said cutting plate having a central passage and slots or grooves radiating from said central passage to receive the edges of said cutting head; and a centering pin on the trap-door within said central passage.

2. In a fruit slicing and coring machine: supporting standards; a lower saddle supported by the same; an upper plate supported by the standards and having a shaft bearing; a shaft bearing mounted on said saddle; a shaft rotatably mounted in said shaft bearings; a turn-table carried by said shaft and having trap-door controlled openings; funnels on said turn-table encircling said openings; a stationary cam track for effecting the opening and closing of said trap doors; a drum mounted on and turning with said turn-table concentrically with said shaft and openings; brackets carried by said drum; slide bar bearings on said brackets; slide bars mounted in said slide bar bearings; slicing and coring heads carried by said slide bars; stationary cam tracks mounted on said supporting standards for raising and lowering said slide bars and their heads, said bars having cam-track-engaging elements; stationary core ejectors carried by said brackets to eject the cores from said slicing and coring heads; and fruit-slices ejectors carried by said heads.

3. In a machine of the class described: supporting standards; a hood secured to the upper ends of said standards; a saddle; braces supporting said saddle between said standards; a plate having a shaft bearing secured beneath said hood; a shaft bearing mounted on said saddle; a turn-table having at least one opening and having a shaft mounted to turn in said bearings; a drive motor mounted on said hood; power-transmitting connections in the hood between said motor and said turn-table shaft; upper and lower stationary cam-ring tracks carried by said supports; a trap door for said turn-table opening hinged to the under side of said turn-table and having an arm with a roller to ride on the lower cam-ring track to hold the door shut, said lower cam-ring track having a portion removed to drop the trap door to open position at a predetermined place; a drum on said turn-table; a slicing and coring head vertically reciprocatably mounted on said drum in cooperative relation to said trap door; means including a slide-bar and upper-cam-engaging roller carrying said slicing and coring head, the upper cam track having provisions for raising and lowering said slide-bar; means for preventing fruit slices from "flowering" when cut; means carried by said slicing and coring head for ejecting the slices through said opening when the trap door is open; and means for ejecting the core after the slices have been ejected and at a different place than that where the slices are ejected.

4. The machine of claim 3 wherein a guard plate is located directly below and adjacent the cutting end of the cutting head while the cutting head remains elevated.

5. The machine of claim 3 wherein a guard plate is located directly below and adjacent the cutting end of the cutting head while the cutting head remains elevated; and an outer annular guard wall above said guard plate.

EDWARD W. BRIDGE.

REFERENCES CITED

The following references are of record in the file of this patent:

UNITED STATES PATENTS

| Number | Name | Date |
| --- | --- | --- |
| 28,412 | Sanford | May 22, 1860 |
| 129,289 | Meschutt | July 16, 1872 |
| 951,241 | Hampel | Mar. 8, 1910 |
| 1,077,446 | Wolfe | Nov. 4, 1913 |
| 1,146,085 | McVey | July 13, 1915 |
| 1,399,950 | Fish | Dec. 13, 1921 |
| 1,610,236 | Ayars | Dec. 14, 1926 |
| 1,992,688 | Bonvallet | Feb. 26, 1935 |
| 2,097,170 | Wilson | Oct. 26, 1937 |